United States Patent
Wang et al.

(10) Patent No.: US 7,317,520 B2
(45) Date of Patent: Jan. 8, 2008

(54) METHOD AND APPARATUS FOR MEASURING BRIGHTNESS

(75) Inventors: Chung-Wei Wang, Taichung (TW); Shih-Hsien Yang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 173 days.

(21) Appl. No.: 11/130,090

(22) Filed: May 17, 2005

(65) Prior Publication Data
US 2006/0114451 A1 Jun. 1, 2006

(30) Foreign Application Priority Data
Nov. 29, 2004 (TW) .............................. 93136788 A (51) Int. Cl.
*G01J 1/00* (2006.01)

(52) U.S. Cl. ...................... 356/213; 356/218; 356/425; 348/191

(58) Field of Classification Search ........ 356/213–226, 356/419; 396/61, 63; 348/191, 362–363; 345/82
See application file for complete search history.

(56) References Cited

U.S. PATENT DOCUMENTS

| | | | | |
|---|---|---|---|---|
| 4,247,202 A | * | 1/1981 | Failes | ......................... 356/310 |
| 6,329,758 B1 | * | 12/2001 | Salam | ..................... 315/169.2 |
| 6,788,401 B1 | * | 9/2004 | Kitabayashi et al. | ........ 356/124 |
| 2004/0105091 A1 | * | 6/2004 | Zaidi et al. | ................. 356/221 |
| 2004/0201766 A1 | * | 10/2004 | Funston et al. | ........ 348/333.02 |

* cited by examiner

*Primary Examiner*—Tarifur Chowdhury
*Assistant Examiner*—Tara S Pajoohi (57) ABSTRACT

An apparatus for measuring brightness transmitted by a light-emitting display unit of a laser telescope and observed by the user's eyes comprises a focusing unit (11), a sensor unit (12), a processing unit (13) and a display unit (14). A method of measuring brightness includes the steps of: providing a constant color temperature to simulate the external light; providing a tool platform and locating the apparatus for measuring brightness and the laser telescope under test thereon; further providing a light-impermeable cover to cover the laser telescope and the apparatus for avoiding the external light interfering with the measurement of brightness; then turning on the laser telescope and enabling it to range; picking up the light of a reticle and a measured value transmitted from the light-emitting display unit by means of the apparatus for measuring brightness; and at last, displaying the measured value on the display unit of said apparatus for measuring brightness.

22 Claims, 7 Drawing Sheets

METHOD AND APPARATUS FOR MEASURING BRIGHTNESS

BACKGROUND OF THE INVENTION

1. Field of the Invention

The present invention relates to an apparatus for measuring brightness, and more particularly relates to a method and an apparatus for precisely measuring the brightness of a device having a light-emitting display unit.

2. Description of the Prior Art

A light emitting diode (LED) or an organic light emitting diode (OLED) located in a laser telescope is used to display a reticle and a distance value between a target object and the laser telescope. Generally, an original brightness value of the LED or the OLED is offered by manufactory, but it isn't always precise. In the laser telescope, the light of said reticle and the distance value which are displayed on LED or OLED needs to pass through several lenses, for example a focusing lens, a prism group and a ocular lens etc., and then they are observed by user. The factual brightness of the light entering the eyes of user will decline because the lenses of the laser telescope can absorb and reflect the light. In other words, there is a difference between the factual brightness of the light observed by the eyes of user and the original brightness of the LED or the OLED, thereby the original brightness value of a light-emitting display unit offered by manufactory can't be taken as a basis to estimate whether a product having the light-emitting display unit is according with standard.

Otherwise, if the factual brightness value is estimated directly by the eyes of user, it is inconsistent and imprecise because of a difference caused by users' sense of sight. For quantizing the factual brightness of a device having the light-emitting display unit, one conventional solution is to utilize a luminance meter or a spectroradiometer to measure. However, it is very difficult to measure the factual brightness value of the LED or the OLED in the laser telescope using these prior apparatuses, because an area of the light projected by the LED or the OLED is very small. Additionally, these apparatuses are very expensive and not fit to be utilized in a scene of mass production.

Hence, a method to overcome the above-mentioned disadvantages of the prior art will be described in detail in the following embodiments.

BRIEF SUMMARY OF THE INVENTION

Accordingly, an object of the present invention is to provide an apparatus for measuring brightness to simplify the operation of measuring brightness and to improve the examining process and the measurement precision.

A further object of the present invention is to provide a method for precisely measuring brightness which is applied to any device having a light-emitting display unit and is used to stimulate the factual brightness of the light thereof arriving at the user's eyes, thereby precisely quantizing the measurement result.

Another object of the present invention is to provide a method and an apparatus for measuring brightness which is applied to a small-area of light-displaying unit to stimulate the focusing ability of the user's eyes, thereby making for more conveniently measuring brightness and also fast improving the examining process and the measurement precision.

Another object of the present invention is to provide a method and an apparatus for measuring brightness which is able to quantize precisely the factual brightness of a light-emitting display unit located in a laser telescope by means of picking up the light deriving from an ocular lens of the laser telescope.

To achieve the above objects of the present invention, a method for measuring brightness of a device having a light-emitting display unit comprises the following steps:

(a) providing an apparatus for measuring brightness, the apparatus including a focusing unit converging the light, a sensor unit picking up light signals and generating electrical signals which vary with intensity variations of said light, a processing unit performing arithmetic operation to process the electrical signals and to obtain a specific value, and a display unit displaying said specific value;

(b) providing a tool platform and locating the apparatus for measuring brightness and a device under test having a light-emitting display unit thereon;

(c) providing a simulating device, a housing thereof defining a first space filled with a constant color temperature for simulating a working environment of the device under test, and a second space receiving the apparatus for measuring brightness and the device under test, sidewalls surrounding the second space having a light-impermeable character;

(d) placing the apparatus for measuring brightness and the device under test both located on the tool platform into the second space of the simulating device to avoid the external light-interference, and therefore the constant color temperature in the first space supplying the needed light for the device under test;

(e) activating the device under test and enabling a light-emitting display unit thereof to work; and (f) picking up the light of said light-emitting display unit by means of the apparatus for measuring brightness, and displaying the measured value on the display unit of said apparatus.

When the above-mentioned method for measuring brightness is used to quantize precisely the brightness of the light emitted by a light-emitting display unit of a laser telescope and observed by the eyes of user, the working theory of the apparatus for measuring brightness is described as following text.

Firstly, the focusing unit of said apparatus must converge the light under test coming from the light-emitting display unit of the laser telescope. Secondly, the sensor unit of said apparatus will pick up the image in a specific region around a reticle of the light-emitting display unit of the laser telescope, and obtain not only the red light brightness of the reticle but also the red light brightness of a background in the specific region, and then convert light signals into electrical signals. Then the processing unit of said apparatus will obtain a maximum brightness value and a minimum brightness value of the red light in the specific region, and calculate a difference value between the maximum brightness value and the minimum brightness value by means of processing the received electrical signals. Then the display unit of said apparatus will display the difference value. Finally, the tester will judge whether the laser telescope is according with standard on the basis of said difference value.

The step (b) of the present method for measuring brightness further comprises: adjusting the locations of the apparatus for measuring brightness and the device under test, and enabling said apparatus to be aligned with the light-displaying location of the light-emitting display unit of the device under test.

The device under test used in the present method and apparatus for measuring brightness may also be a binocular laser telescope having a light-emitting display unit.

The sensor unit used in the above method and apparatus for measuring brightness can pick up the image in a specific region around a reticle of the light-emitting display unit of the binocular laser telescope, and then obtain not only the red light brightness of the reticle but also the red light brightness of a background in the specific region.

The sensor unit used in the above method and apparatus for measuring brightness can pick out the red light according with the specific wavelength, and then convert said red light signals into the electrical signals.

The processing unit used in the above method and apparatus for measuring brightness can obtain a maximum brightness value and a minimum brightness value of the red light in the specific region, and then calculate a difference value between the maximum brightness value and the minimum brightness value after processing the electrical signals.

The above maximum brightness value of the red light is a maximum brightness value of the red light emitted by the center region of the reticle of the light-emitting display unit, and the above minimum brightness value of the red light is a minimum brightness value of the red light emitted by the background in the specific region of the light-emitting display unit.

In comparison with the prior art, the method and the apparatus for measuring brightness in accordance with the present invention has the following advantages:

1. By using a focusing unit to simulate the focusing ability of the user's eyes, it is more convenience to converge the light coming from a light-emitting display unit of a device under test.

2. By using a sensor unit to convert the light signals to electrical signals and using a processing unit to process the electrical signals and to obtain a specific value, the device under test thus is easily confirmed whether or not according with standard by said specific value, and a difference caused by users' sense of sight is eliminated.

3. By adopting a simulating device to avoid the external light-interference, the measurement precision is increased.

4. By the provision of the method and the apparatus for measuring brightness according to the present invention, the examining process and the measurement precision are all improved, the measured result is reliable, the apparatus for measuring brightness is easy produced and the production cost is reduced.

DETAILED DESCRIPTION OF THE INVENTION

In this preferred embodiment of the present invention, we will take a binocular laser telescope as an example for illustrating a method and an apparatus for measuring brightness according to the present invention.

In the binocular laser telescope, the question described in the prior art is also existing. In other words, there is a difference between the factual brightness of the light, which is representing a reticle and a distance value observed by user, and the original brightness of an OLED because the lenses located in the binocular laser telescope can absorb and reflect the light emitted by the OLED. Therefore it's essential to do a double check for the factual brightness of the light of the OLED that can arrive at the eyes of user. Whereby the factual brightness of the product thus is confirmed whether or not according with standard. A method and an apparatus for measuring brightness according to the present invention is to measure and quantize the factual brightness of the light arrived at the eyes of user, and then set a limit value. Thereby manufactory of the product can judge between a good product, a brightness value of which is to exceed the limit value, and a non-good product, a brightness value of which is to fall short of the limit value. A detailed process of measuring brightness will be described as following text.

Figure 1:
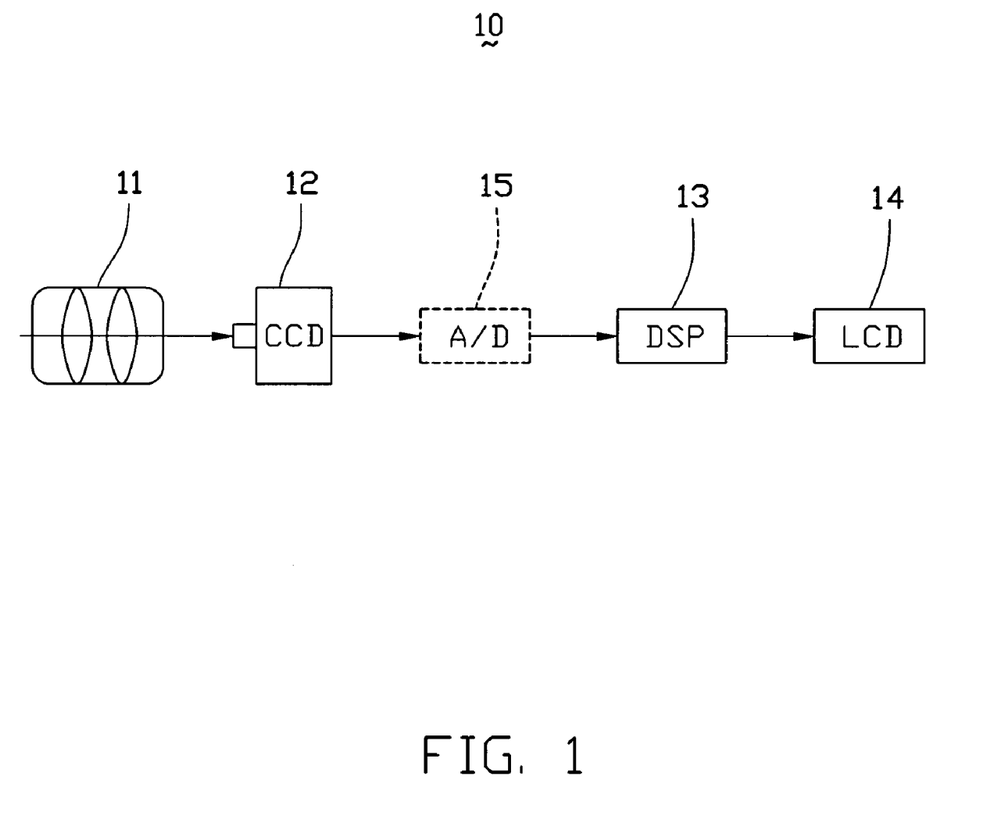
FIG. 1 is a block diagram of an apparatus for measuring brightness according to the present invention.

The apparatus for measuring brightness according to the present invention can adopt parts of a common digital still camera (DSC) to pick up the brightness of the OLED under test and display a precise measured brightness value. Please refer to FIG. 1, the apparatus 10 according to the present invention comprises a focusing unit 11 that can adopt a camera lens to simulate the focusing ability of the user's eyes, a sensor unit 12 that can adopt a charge coupled device (CCD) sensor or a complementary metal oxide semiconductor (CMOS) sensor of the DSC, a processing unit 13 being a digital signal processor (DSP), and a display unit 14 that may be a liquid crystal display (LCD) or an OLED or a super twisted nematic display (STN). The focusing unit 11 is used to converge the light onto the sensor unit 12. The sensor unit 12 is able to pick up the wanted light and generate electrical signals that vary with intensity variations of said light. The processing unit 13 can perform arithmetic operation to process the electrical signals and obtain a specific value. The display unit 14 can display said specific value.

Figure 2:
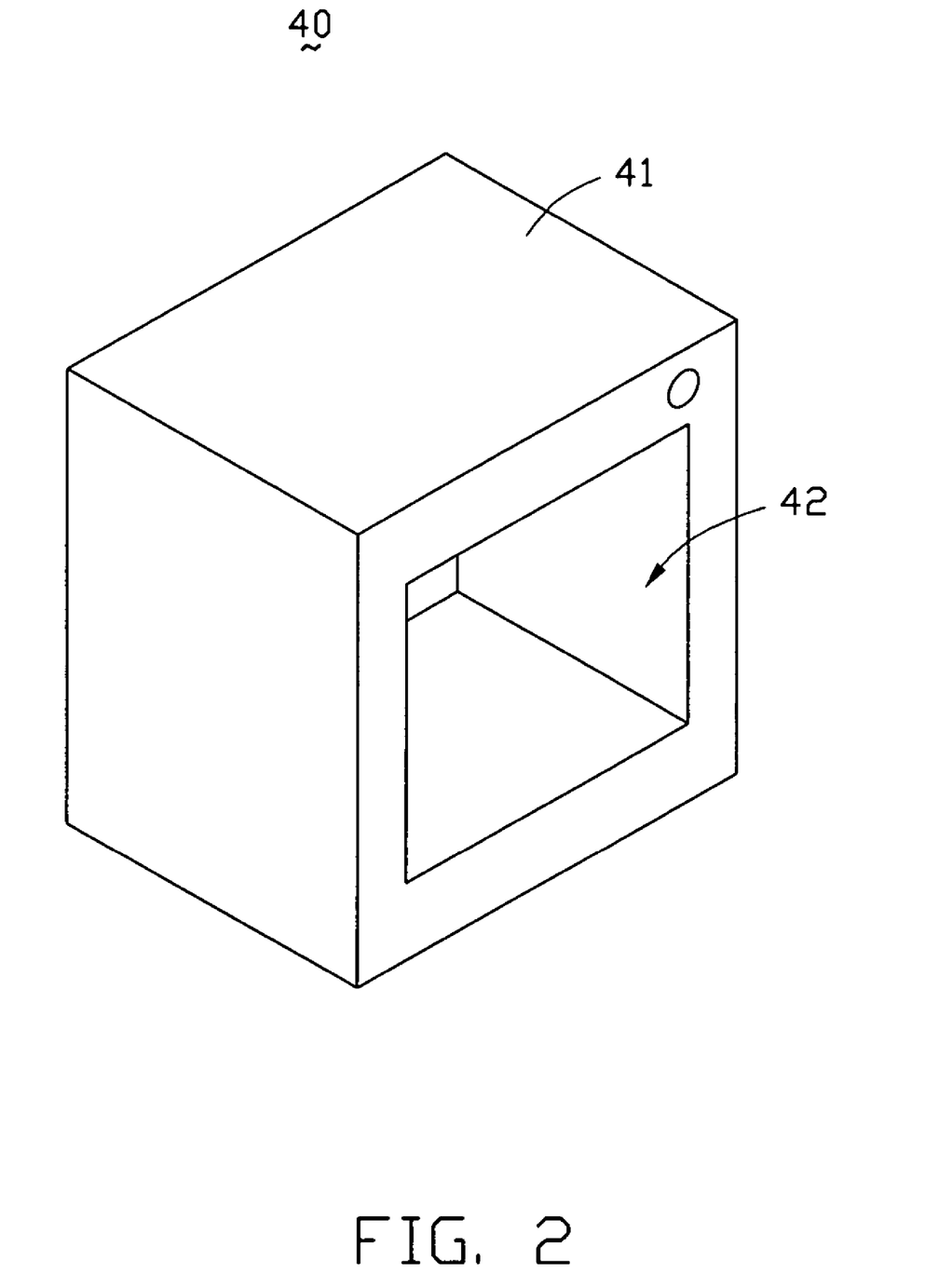
FIG. 2 is a schematic view illustrating a color temperature device used in the process of measuring brightness according to the present invention.

Referring to FIG. 2, we will adopt a color temperature device 40 for accurately simulating a natural environment that the binocular laser telescope can range and be observed by the user's eyes. A housing 41 of said color temperature device 40 defines a measurement space 42 filled with a constant color temperature supplied by a number of color temperature lamps 43 shown in FIG. 3B.

Figure 3A:
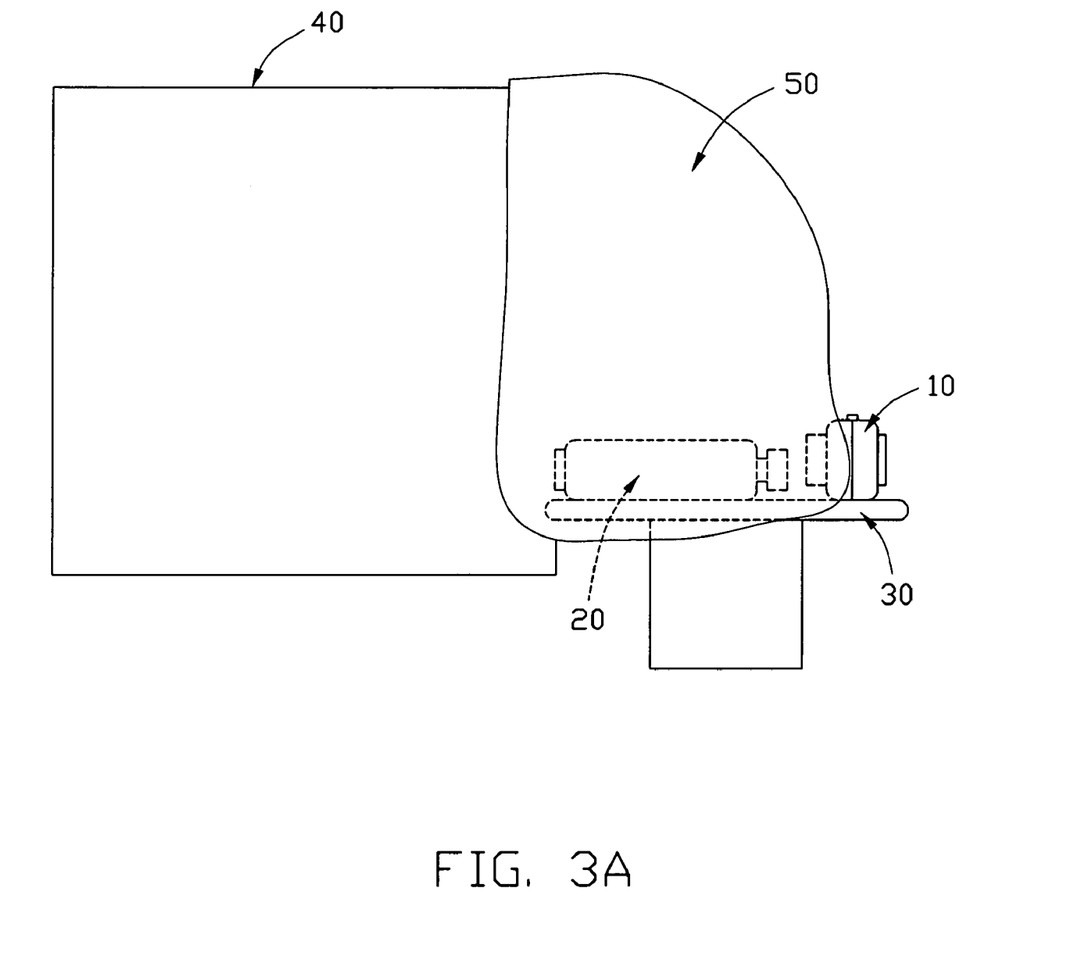
FIG. 3A is a schematic view illustrating a method and an apparatus for measuring brightness according to the present invention.
Figure 3B:
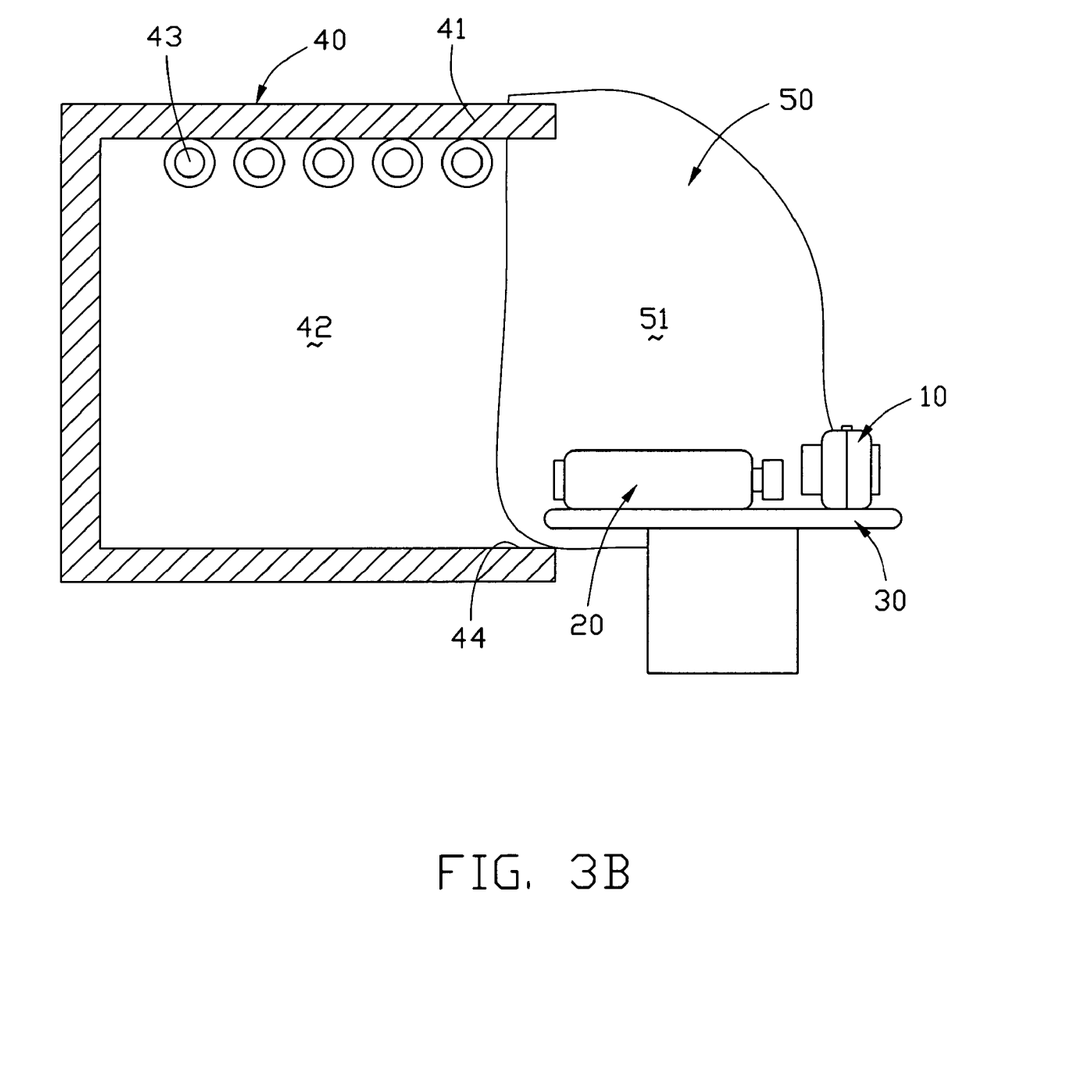
FIG. 3B is a schematic cross-section view illustrating a method and an apparatus for measuring brightness according to the present invention.

Referring to FIGS. 3A and 3B, first, the binocular laser telescope 20 under test and the apparatus 10 are all placed on the same tool platform 30, wherein an object lens (not shown) of the binocular laser telescope 20 faces an opening 44 of the measurement space 42 defined by the housing 41 of the color temperature device 40. A black cloth 50 that may be replaced with other light-impermeable covers is used to cover the color temperature device 40, the binocular laser telescope 20 and the apparatus 10, thereby forming a closed space 51 around them to prevent the external light from entering there between, so as to improve the measurement precision. Then it is needed to adjust the locations of the focusing unit 11 of the apparatus 10 and the right tube (not shown, in which the display panel of the OLED is located) of the binocular laser telescope 20 to be aligned with a straight line, whereby the sensor unit 12 of the apparatus 10 may pick up the accurate light for improving the reliability of the measured result.

In factual application, the above-mentioned functions of the color temperature device 40 and the light-impermeable cover may be performed by a simulating device (not shown). A housing of the simulating device defines a first space and a second space, wherein the first space is filled with a constant color temperature supplied by at least a color temperature lamp for simulating a working environment of a device under test (such as the binocular laser telescope 20). The second space is used to receive the device under test and the apparatus 10 for measuring brightness. Sidewalls surrounding the second space have a light-impermeable character. Furthermore, the simulating device will make for more conveniently and fast measuring brightness.

Figure 4:
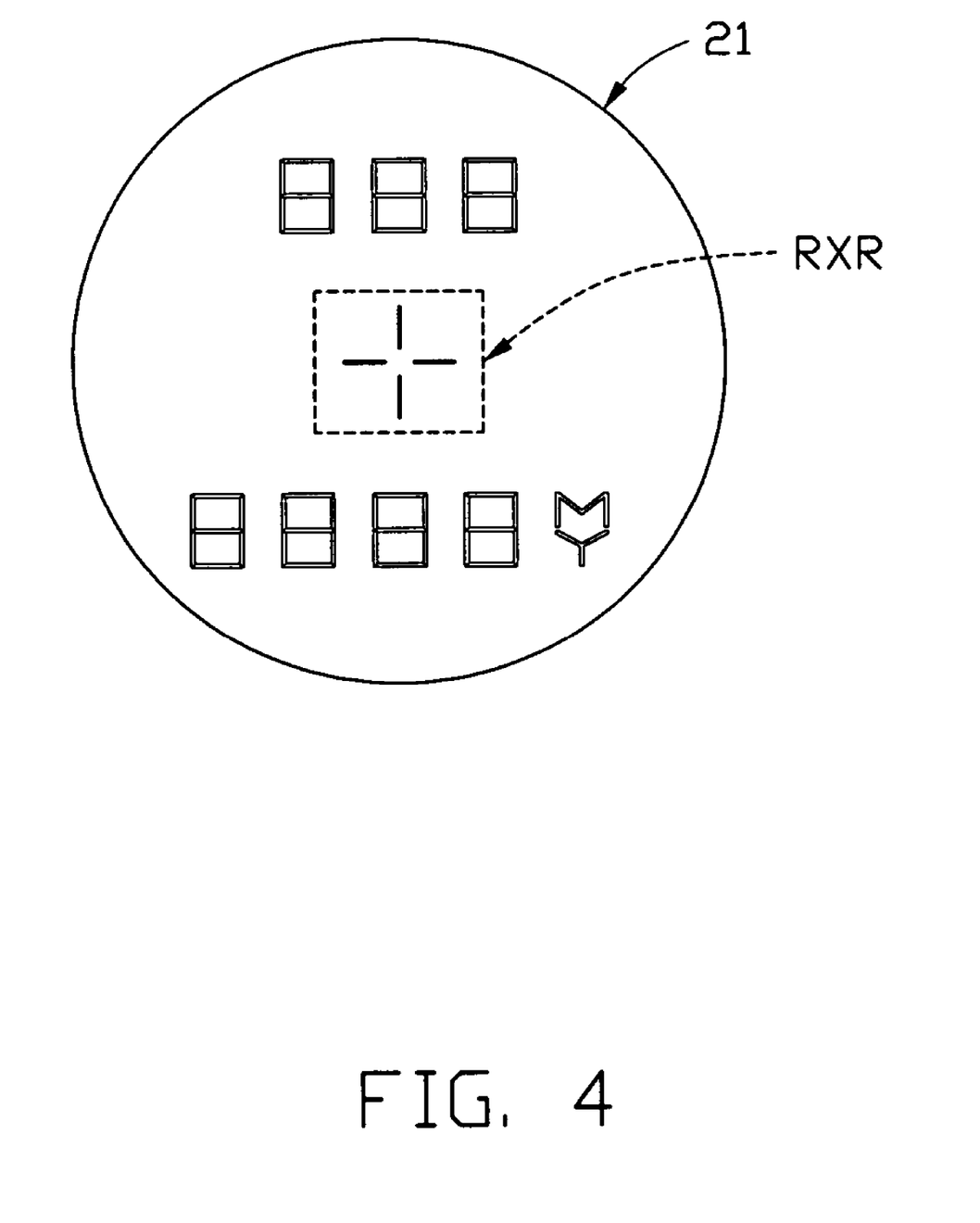
FIG. 4 is a schematic view illustrating an OLED display panel of a product under test, and a range of pick-up the light on the OLED display panel is indicated in this view.

In the process of measuring brightness, first the binocular laser telescope 20 will range and display a distance value on the display panel of the OLED, then the sensor unit 12 (CCD) of the apparatus 10 will pick up the brightness of the red reticle on the center of the OLED display panel 21. Referring to FIG. 4, a brightness range of the red reticle picked by the apparatus 10 is a quadrate region that the width is R and the length is R.

Figure 5:
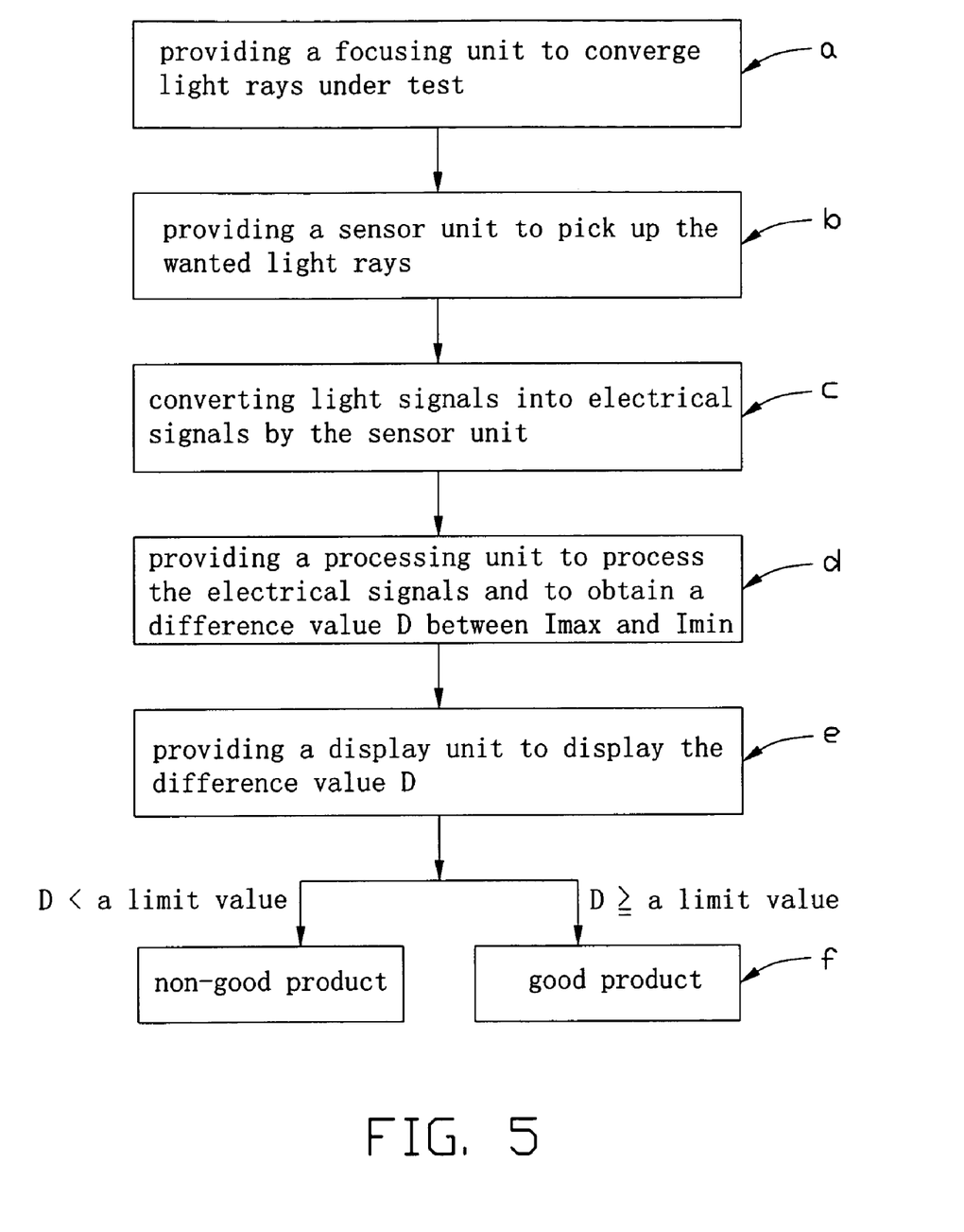
FIG. 5 is a flow schematic view illustrating the process of measuring brightness according to the present invention.
Figure 6:
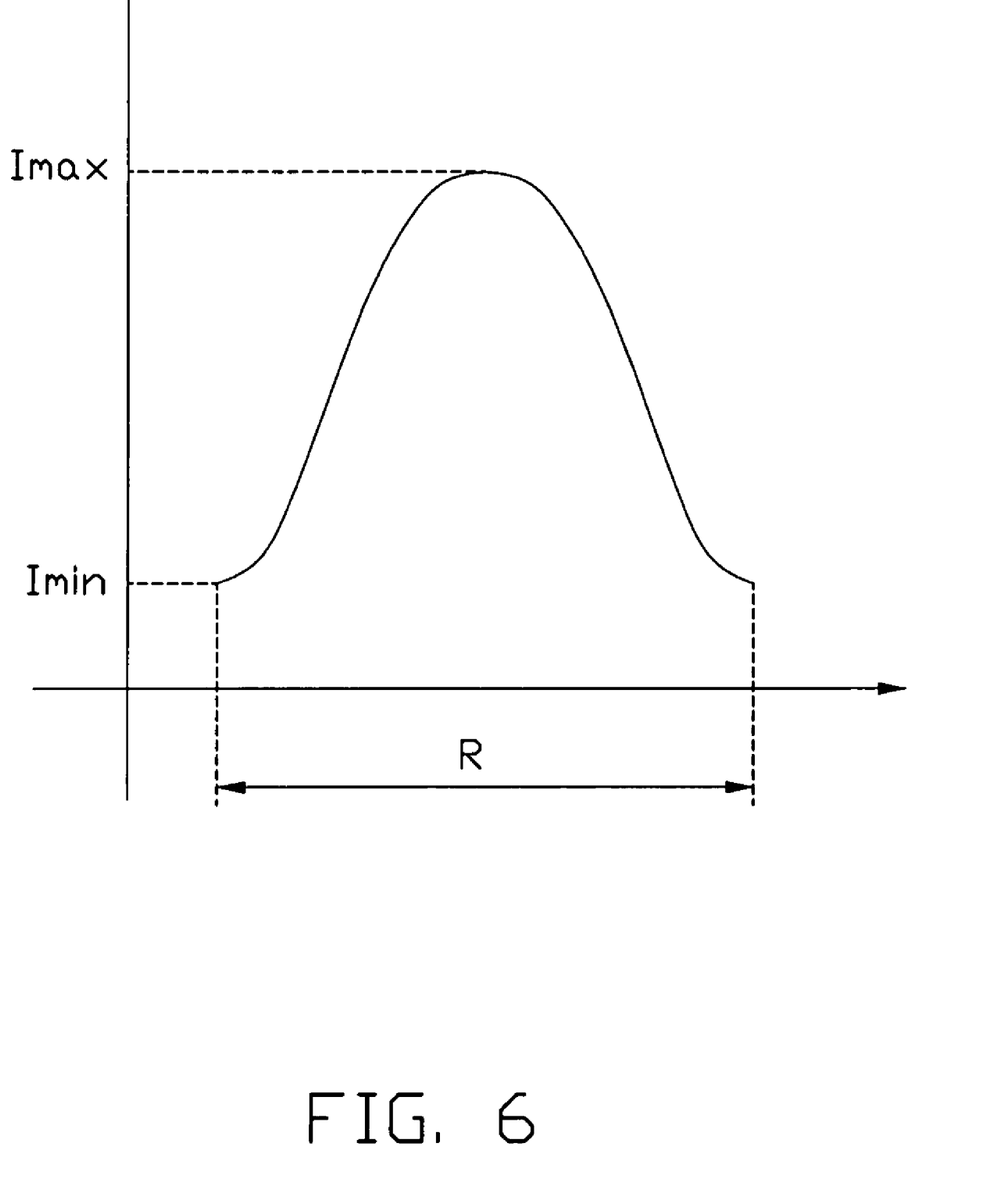
FIG. 6 is a schematic view illustrating a range of brightness value, a maximum brightness value and a minimum brightness value of the red light coming from the OLED display panel and finally picked by a CCD sensor of the present invention.

Referring to FIG. 5, a method for measuring brightness comprises following steps:

(a) converging the light coming from the ocular lens of the binocular laser telescope 20 by means of the focusing unit 11 of the apparatus 10;

(b) picking up the wanted light using the sensor unit 12 of the apparatus 10, namely, using the CCD sensor 12 for picking up the image in the quadrate region that the width is R and the length is R, whereby the CCD sensor 12 can obtain not only the red light brightness of the reticle but also the red light brightness of a background;

(c) converting light signals into electrical signals by means of the sensor unit 12, namely, the sensor unit 12 will leach the blue light and the green light ,so as to pick up the red light according with the OLED wavelength, and then convert the light signals into the electrical signals;

(d) processing the electrical signals using the processing unit 13 to obtain a difference value D between a maximum brightness value and a minimum brightness value of the red light in the quadrate region that the width is R and the length is R. In other words, after the operation of the processing unit, the apparatus 10 will obtain the maximum brightness value (Imax) of the red light emitted by the center of the reticle, the minimum brightness value (Imin) of the red light emitted by the background in the quadrate region that the width is R and the length is R, and the difference value D between Imax and Imin. FIG. 6 is a schematic view illustrating a range of the brightness value of the red light picked by the CCD sensor 12 in the quadrate region;

(e) displaying the difference value D on the display unit 14 that may be a LCD panel of the apparatus; and (f) judging by the difference value D whether the product is good or not-good. If the difference value D is less than the limit value, the tested binocular laser telescope 20 is a non-good product. If the difference value D is larger than the limit value, the tested binocular laser telescope 20 is a good product.

In this preferred embodiment of the present invention, the brightness value obtained in the process of measuring brightness is corresponding to the analog electrical signals value which varies with intensity variations of the light generated by the sensor unit 12. If said analog electrical signals value is converted into the digital electrical signals value by the A/D unit 15 (shown with the broken line in FIG. 1), the range of said digital electrical signals value will be between 0 and 255. If the limit value is set to 95, namely, if the difference value between Imax and Imin is larger than 95, the tested product will be taken as a good product.

By introducing the above-mentioned process for measuring brightness, we can easily find that the examining process of the product under test is improved and the measured value is provided for reference, thereby solving the traditional question of the brightness difference caused by users' sense of sight when estimated directly by the user's eyes, and also increasing the velocity of manufacturing and shipping. Moreover, most components of the apparatus for measuring brightness according to the present invention are produced by means of modifying the existed product, thereby saving the cost of manufacture.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for measuring brightness from a perspective of a user of a device having a light-emitting display unit, comprising following steps:

(a) providing an apparatus for measuring brightness, the apparatus including a focusing unit converging the light, a sensor unit picking up the wanted light and generating electrical signals which vary with intensity variations of said light, a processing unit performing arithmetic operation to process the electrical signals and to obtain a specific value, and a display unit displaying said specific value;

(b) providing a tool platform and locating the apparatus and a device under test having a light-emitting display unit thereon;

(c) providing a simulating device, a housing thereof defining a first space filled with a constant color temperature for simulating a working environment of the device under test, and a second space receiving the apparatus and the device under test, sidewalls surrounding the second space having a light-impermeable character;

(d) placing the apparatus and the device under test both located on the tool platform into the second space to avoid the external light interfering with the measurement of brightness;

(e) activating the device under test and enabling a light-emitting display unit thereof to work; and (f) picking up the light of a specific region of said light-emitting display unit by the sensor unit of the apparatus, and obtaining a maximum brightness value of the picked up light and a minimum brightness value of the picked up light and calculating a difference value between the maximum brightness value and the minimum brightness value by the processing unit of the apparatus, and then displaying said difference value on the display unit of said apparatus; and (g) judging from the perspective of the user whether the difference value exceeds a limit value, if the difference value is larger than said limit value, the tested device is an accepted product; if the difference value is less than said limit value, the tested device is a rejected product.

2. The method for measuring brightness as claimed in claim 1, wherein the sensor unit of the apparatus is a CCD or a CMOS sensor.

3. The method for measuring brightness as claimed in claim 1, wherein the processing unit of the apparatus is a digital signal processor.

4. The method for measuring brightness as claimed in claim 1, wherein the display unit of the apparatus is a LCD or an OLED or a STN.

5. The method for measuring brightness as claimed in claim 1, wherein the constant color temperature is supplied by a number of color temperature lamps located in the first space.

6. The method for measuring brightness as claimed in claim 1, wherein the step (b) also further comprising: adjusting the locations of the apparatus and the device under test, and enabling said apparatus to be aligned with the light-displaying location of the light-emitting display unit of the device under test.

7. The method for measuring brightness as claimed in claim 6, wherein the device under test is a binocular laser telescope having a light-emitting display unit.

8. The method for measuring brightness as claimed in claim 7, wherein the specific region is a region around a reticle of the light-emitting display unit of the binocular laser telescope, and the sensor unit of the apparatus is configured to pick up the red light of the reticle and the red light of a background in the specific region.

9. The method for measuring brightness as claimed in claim 8, wherein the sensor unit of the apparatus can pick out the red light according with the specific wavelength, and then convert said red light signals into the electrical signals.

10. The method for measuring brightness as claimed in claim 9, wherein said maximum brightness value of the light is a maximum brightness value of the red light emitted by the center region of the reticle of the light-emitting display unit, and said minimum brightness value of the red light is a minimum brightness value of the light emitted by the background in the specific region of the light-emitting display unit.

11. A method for measuring brightness from a perspective of a user of a device having a light-emitting display unit, comprising following steps:
(a) providing a constant color temperature for simulating a working environment of a device under test having a light-emitting display unit;
(b) providing an apparatus for measuring brightness, the apparatus including a focusing unit converging the light, a sensor unit picking up the wanted light and generating electrical signals which vary with intensity variations of said light, a processing unit performing arithmetic operation to process the electrical signals and to obtain a specific value, and a display unit displaying said specific value;
(c) providing a tool platform and locating the apparatus and the device under test having the light-emitting display unit thereon;
(d) providing a light-impermeable device, a housing thereof defining a receiving space;
(e) placing the apparatus and the device under test both located on the tool platform into the receiving space of the light-impermeable device to avoid the external light interfering with the measurement of brightness, and only the constant color temperature supplying the needed light for the device under test;
(f) activating the device under test and enabling a light-emitting display unit thereof to work;
(g) picking up the light of a specific region of said light-emitting display unit by the sensor unit of the apparatus, and obtaining a maximum brightness value of the picked up light and a minimum brightness value of the picked up light and calculating a difference value between the maximum brightness value and the minimum brightness value by the processing unit of the apparatus, and then displaying said difference value on the display unit of said apparatus; and
(h) judging from the perspective of the user whether the difference value exceeds a limit value, if the difference value is larger than said limit value, the tested device is an accepted product; if the difference value is less than said limit value, the tested device is a rejected product.

12. The method for measuring brightness as claimed in claim 11, wherein the constant color temperature is supplied by a color temperature device having a number of color temperature lamps.

13. The method for measuring brightness as claimed in claim 12, wherein the light-impermeable device is a light-impermeable cover that can cover the device under test and the apparatus.

14. The method for measuring brightness as claimed in claim 13, wherein the focusing unit of the apparatus is a focusing lens.

15. The method for measuring brightness as claimed in claim 13, wherein the sensor unit of the apparatus is a CCD or a CMOS sensor.

16. The method for measuring brightness as claimed in claim 13, wherein the processing unit of the apparatus is a digital signal processor.

17. The method for measuring brightness as claimed in claim 13, wherein the display unit of the apparatus is a LCD or an OLED or a STN.

18. The method for measuring brightness as claimed in claim 13, wherein the device having the light-emitting display unit is a laser telescope.

19. The method for measuring brightness as claimed in claim 18, wherein the light-emitting display unit of the device has a reticle to be aimed at an object.

20. The method for measuring brightness as claimed in claim 19, wherein the specific region is a region around the reticle of the light-emitting display unit, and the sensor unit provided in the step (b) is configured to pick up the red light of the reticle and the red light of a background in the specific region.

21. The method for measuring brightness as claimed in claim 20, wherein said maximum brightness value of the light is a maximum brightness value of the red light emitted by the center region of the reticle of the light-emitting display unit, and said minimum brightness value of the light is a minimum brightness value of the red light emitted by the background in the specific region of the light-emitting display unit.

22. The method for measuring brightness as claimed in claim 21, wherein it is needed to adjust the locations of the apparatus and the laser telescope to be aligned with each other before measuring brightness.

* * * * *